(12) United States Patent
Krahenbuhl et al.

(10) Patent No.: US 9,436,301 B2
(45) Date of Patent: Sep. 6, 2016

(54) PORTABLE ELECTRONIC DEVICE HAVING INTERCHANGEABLE USER INTERFACES AND METHOD THEREOF

(75) Inventors: John Henry Krahenbuhl, McHenry, IL (US); Rachid M. Alameh, Crystal Lake, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 467 days.

(21) Appl. No.: 13/172,502

(22) Filed: Jun. 29, 2011

(65) Prior Publication Data

US 2013/0002531 A1    Jan. 3, 2013

(51) Int. Cl.
*G09G 5/00* (2006.01)
*G06F 3/041* (2006.01)

(52) U.S. Cl.
CPC ............. *G06F 3/041* (2013.01); *G06F 3/0416* (2013.01)

(58) Field of Classification Search
CPC .. G06F 3/03545; G06F 3/041; G06F 3/0416; G06F 3/0433; G06F 3/046; G06Q 20/02; G06Q 20/32
USPC ................. 345/156, 153, 173, 102; 320/101; 361/173; 370/311
See application file for complete search history.

(56) References Cited

U.S. PATENT DOCUMENTS

| | | |
|---|---|---|
| 6,492,979 B1 | 12/2002 | Kent et al. |
| 6,504,530 B1 | 1/2003 | Wilson et al. |
| 6,801,794 B2 * | 10/2004 | Bauer ........................... 455/574 |
| 7,401,300 B2 | 7/2008 | Nurmi |
| 8,184,423 B2 * | 5/2012 | Rothkopf ....................... 361/173 |
| 2006/0119313 A1 * | 6/2006 | Chang ........................... 320/101 |
| 2007/0216655 A1 | 9/2007 | Chen et al. |
| 2008/0123000 A1 * | 5/2008 | Lin ................... G02F 1/133555 349/33 |

(Continued)

FOREIGN PATENT DOCUMENTS

| | | |
|---|---|---|
| CN | 101369213 A | 2/2009 |
| EP | 1993030 A1 | 11/2008 |

(Continued)

OTHER PUBLICATIONS

National Computer Solutions "Environmental Sensors Hubs", Aug. 10, 2010, pp. 1-3, http://www.ncs-us.com/sensorshubs.htm.

(Continued)

*Primary Examiner* — Andrew Sasinowski
*Assistant Examiner* — Kuo Woo
(74) *Attorney, Agent, or Firm* — Sumaker & Sieffert, P.A.

(57) ABSTRACT

A portable electronic device comprising a housing, and a first user interface, a second user interface and one or more sensors supported by the housing, and a method thereof. The first user interface has an active state, and the second user interface has an inactive state while the first user interface is in the active state. The sensor or sensors detect an environmental condition. The second user interface changes from the inactive state to the active state and the first user interface changes from the active state to the inactive state in response to one or more sensors detecting the environmental condition. For another embodiment, the device may detect an energy level of a power source of the portable electronic device. The second user interface of the portable electronic device is then activated and the first user interface of the portable electronic device is deactivated in response to detecting the energy level of the power source.

17 Claims, 3 Drawing Sheets

(56) References Cited

U.S. PATENT DOCUMENTS

| | | |
|---|---|---|
| 2009/0278805 A1 | 11/2009 | Kao et al. |
| 2010/0053116 A1 | 3/2010 | Daverman et al. |
| 2010/0141601 A1 | 6/2010 | Kim et al. |
| 2010/0226298 A1* | 9/2010 | Chan et al. .................. 370/311 |
| 2010/0277454 A1 | 11/2010 | Gettemy et al. |
| 2010/0309147 A1 | 12/2010 | Fleizach et al. |
| 2011/0050619 A1 | 3/2011 | Griffin |
| 2011/0116201 A1 | 5/2011 | Rothkopf |
| 2012/0242588 A1* | 9/2012 | Myers .................. G06F 1/1637 345/173 |
| 2014/0043295 A1 | 2/2014 | Alameh et al. |

FOREIGN PATENT DOCUMENTS

| | | |
|---|---|---|
| GB | 2288665 A | 10/1995 |
| KR | 20110066949 A | 6/2011 |
| WO | 2006133018 A2 | 12/2006 |
| WO | 2010026395 A2 | 3/2010 |
| WO | 2011008629 A1 | 1/2011 |

OTHER PUBLICATIONS azstarnet.com, "Disabled Control Computer with their Breath", Sep. 27, 2010, 2 pages, http://azstarnet.com/news/science/health-med-fit/article_2759e0d1-2a77-...1.

Patent Cooperation Treaty, "PCT Search Report and Written Opinion of the International Searching Authority" for International Application No. PCT/US2012/042117, Oct. 5, 2012, 11 pages.

United States Patent and Trademark Office, "Non-Final Rejection" for U.S. Appl. No. 13/569,489 dated Feb. 27, 2014, 11 pages.

Office Action, and translation thereof, from counterpart Korean Application No. 10-2013-7034329, dated Mar. 27, 2015, 9 pp.

First Office Action and Search Report, and translation thereof, from counterpart Chinese Application No. 201280031411.6, dated Sep. 17, 2015, 25 pp.

Second Office Action, and translation thereof, from counterpart Chinese Application No. 201280031411.6, dated Apr. 22, 2016, 4 pp.

* cited by examiner

PORTABLE ELECTRONIC DEVICE HAVING INTERCHANGEABLE USER INTERFACES AND METHOD THEREOF

FIELD OF THE INVENTION

The present invention relates generally to the field of portable electronic devices and, in particular, to portable electronic devices having the capability of switching between two or more user interfaces.

BACKGROUND OF THE INVENTION

A portable electronic device is capable of interacting with a user and transportable due to its diminutive size and portable power supply. Portable electronic devices come in a variety of form factors, such as brick, bar, flip/clamshell, slider or rotator/swivel form factors, and each form factor can have one or more input components, such as a touch screen or QWERTY keypad. Regardless of the small form factor, the device generally includes a user interface to interact with a user or otherwise facilitate the user's use and enjoyment of the device.

Some portable electronic device having multiple user interfaces operating simultaneously, but the energy required to maintain these user interfaces takes its toll on battery life. For example, a device having two separate overlays, such as a resistive and capacitive touch sensor, operating simultaneously in the same device will consume more power than another device having only one overlay. Thus, a portable electronic device having multiple user interfaces can provided more options and better performance than a device having a single user interface, the power consumption of the multiple user interface device is higher, thus resulting in lower battery life.

Other portable electronic devices may detect when their battery level falls below a preselected level in order to manage power consumption. Upon detecting such a condition, a device can give the user an option to select a different display mode of the screen. For example, the device can prompt the user to change its display mode from color to monochrome in order to enhance the battery life. However, even though these devices can manage power consumption, they do not provide multiple user interfaces and, thus, the more options and better performance provided by having multiple user interfaces. Further, these devices do not provide any way to manage power consumption for multiple user interfaces.

DETAILED DESCRIPTION OF THE EMBODIMENTS

Figure 1:
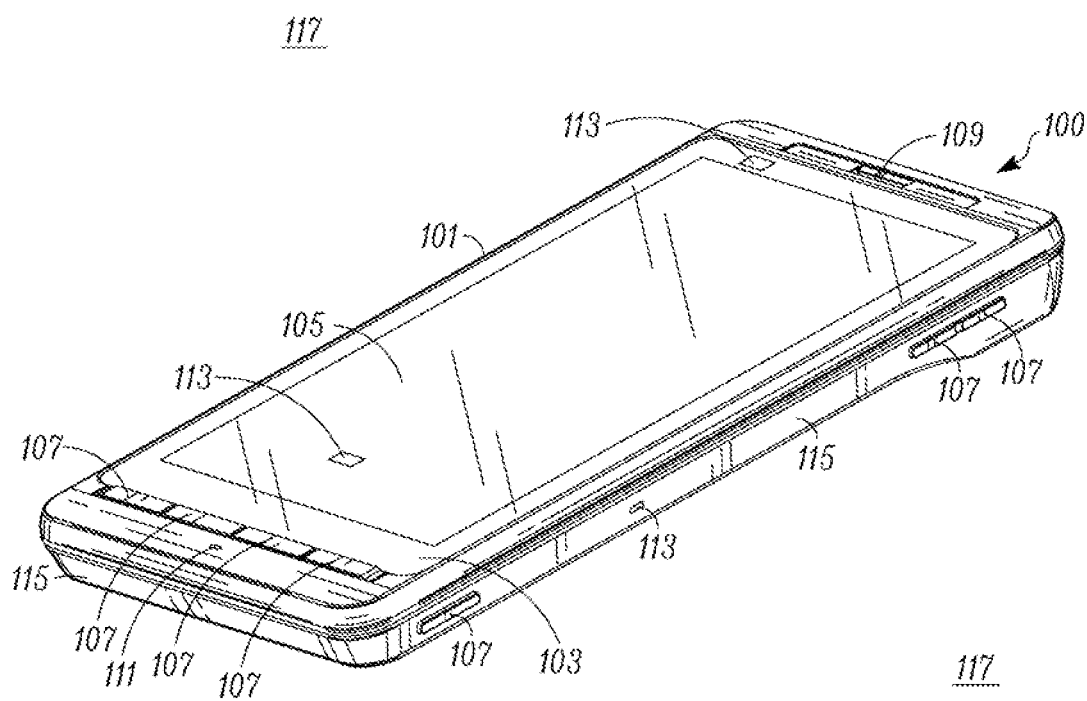
FIG. 1 is a perspective view of an embodiment in accordance with the present invention.

There is described a device and method that provides a mechanism to select user interface sub-systems for primary input based on transitory conditions and user preferences. For example, the method may provide for selection of touch-sensitive screen technology sub-system for touch-sensitive screen input based on ambient conditions. A user or system may set preferences for sub-systems of the input. These preferences may be utilized to optimize performance under various conditions, such as low battery, ambient conditions, temperature conditions, pressure conditions, moisture conditions, ambient noise levels, and the like.

For one aspect, the portable electronic device may comprise a housing, and a first user interface, a second user interface and one or more sensors supported by the housing. The first user interface has an active state, and the second user interface has an inactive state while the first user interface is in the active state. The sensor or sensors detect a predetermined environmental condition. The second user interface changes from the inactive state to the active state and the first user interface changes from the active state to the inactive state in response to one or more sensors detecting the predetermined environmental condition.

For another aspect, a method of the portable electronic device may be provided to interchange user interfaces of the device. The device determines that the first user interface of the portable electronic device is active while the second user interface of the portable electronic device is inactive. Next, the predetermined environmental condition is detected by one or more sensors of the portable electronic device. The second user interface of the portable electronic device is then activated and the first user interface of the portable electronic device is deactivated in response to detecting the predetermined environmental condition by the sensor or sensors.

For yet another aspect, the portable electronic device detects an energy level of a power source of the portable electronic device. The second user interface of the portable electronic device is then activated and the first user interface of the portable electronic device is deactivated in response to detecting the energy level of the power source.

For some embodiments, the portable electronic device and method utilize active screen touch technology, which may be user-settable, for optimum user detection and performance of touch screens. Examples of the technology include, but are not limited to, capacitive technology, temperature-based technology, resistive technology, and acoustic technology. For example, a stylus or user finger may be used to navigate touch screens by engaging both capacitive and temperature-based planar technologies together for added reliability. The technologies may be user-settable manually and/or driven via sensors, such as a moisture sensor, a heat sensor, and the like, to adaptively switch between temperature, capacitive, and other technologies that function with a given environment for the device. For example, a capacitive sensor may fail in presence of a liquid (such as water) contacting a touch screen or a user's finger contacting the touch screen while wearing gloves, etc. In such case, for this embodiment, the device may default to a temperature sensor instead of a capacitive sensor due to the presence of the liquid. Detection of liquid contact may also be accomplished indirectly by evaluating a context of the environment. For example, a capacitive sensor may detect water spots and the device may evaluate characteristics of the water spots, such as size and quantity) to determine that they are not likely to be associated with current contact to the input device by the user.

A further aspect of the device and method is the ability to implement a power saving scheme. For some embodiments, the resolution for sensor or touch screen detection may be reduced in low power conditions. For other embodiments, when the power source is running low, the device may switch to a technology with more efficient power performance. Other considerations include, but are not limited to conductivity, dryness, moisture, temperature of elements that contact the sensor or touch screen. For yet other embodiments, sensors may be provided at multiple surfaces or sides of the device and, when a sensor at one surface/side detects a different reading from a sensor at a different surface/side (such as warmer temperatures on side due to direct sun light. Thus, the device may inactivate any components on the appropriate surface/side of the device to protect components, functionality, or conserve power. For still other embodiments, a humidity sensor may be used to control device operations. In particular, temperature, capacitive and/or resistive sensors may be used to detect the presence of moisture and activate/inactivate one or more components of the device in response to this detection. Thus, the operation of switching from one sensor to another may be performed in response to the detection of a predetermined environmental condition, such as moisture or receipt of weather condition data received by a transceiver.

The operation of the device and method are not limited to the sensor described above. An acoustic signature of friction, by user contact or a stylus contact (such as a sliding motion) detected by one of the device sensors, may instigate one or more functions of a device. For example, a rough tip of a user's finger or stylus may generate different acoustic signature than a smooth tip, which may be detected via an accelerometer, gyroscopic component, and the like. For example, this distinction may be detected via an accelerometer tuned in the audible range of few hundred hertz. Different user fingers or types of stylus may generate different audio or smoothness levels, thus being detected by one or more device sensors and activating different functions of the device.

Referring to FIG. 1, there is illustrated a perspective view of an example portable electronic device 100 in accordance with the present invention. The device 100 may be any type of device capable of providing touch screen interactive capabilities. Examples of the portable electronic device 100 include, but are not limited to, mobile device, wireless devices, tablet computing devices, personal digital assistants, personal navigation devices, touch screen input device, touch or pen-based input devices, portable video and/or audio players, and the like. It is to be understood that the portable electronic device 100 may take the form of a variety of form factors, such as, but not limited to, bar, tablet, flip/clam, slider and rotator form factors.

For one embodiment, the portable electronic device 100 has a housing 101 comprising a front surface 103 which includes a visible display 105 and a user interface. For example, the user interface may be a touch screen including a touch-sensitive surface that overlays the display 105. For another embodiment, the user interface or touch screen of the portable electronic device 100 may include a touch-sensitive surface supported by the housing 101 that does not overlay any type of display. For yet another embodiment, the user interface of the portable electronic device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The portable electronic device 100 may also comprise apertures 109, 111 for audio output and input at the surface. It is to be understood that the portable electronic device 100 may include a variety of different combination of displays and interfaces.

The present invention includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. Wherever the sensor or sensors 113 are supported by the housing 101, whether at the exterior boundary or within the exterior boundary, the sensor or sensors detect a predetermined environmental condition associated with an environment 117 external to the housing. Examples of the sensors 113 are described below in reference to FIG. 2.

Figure 2:
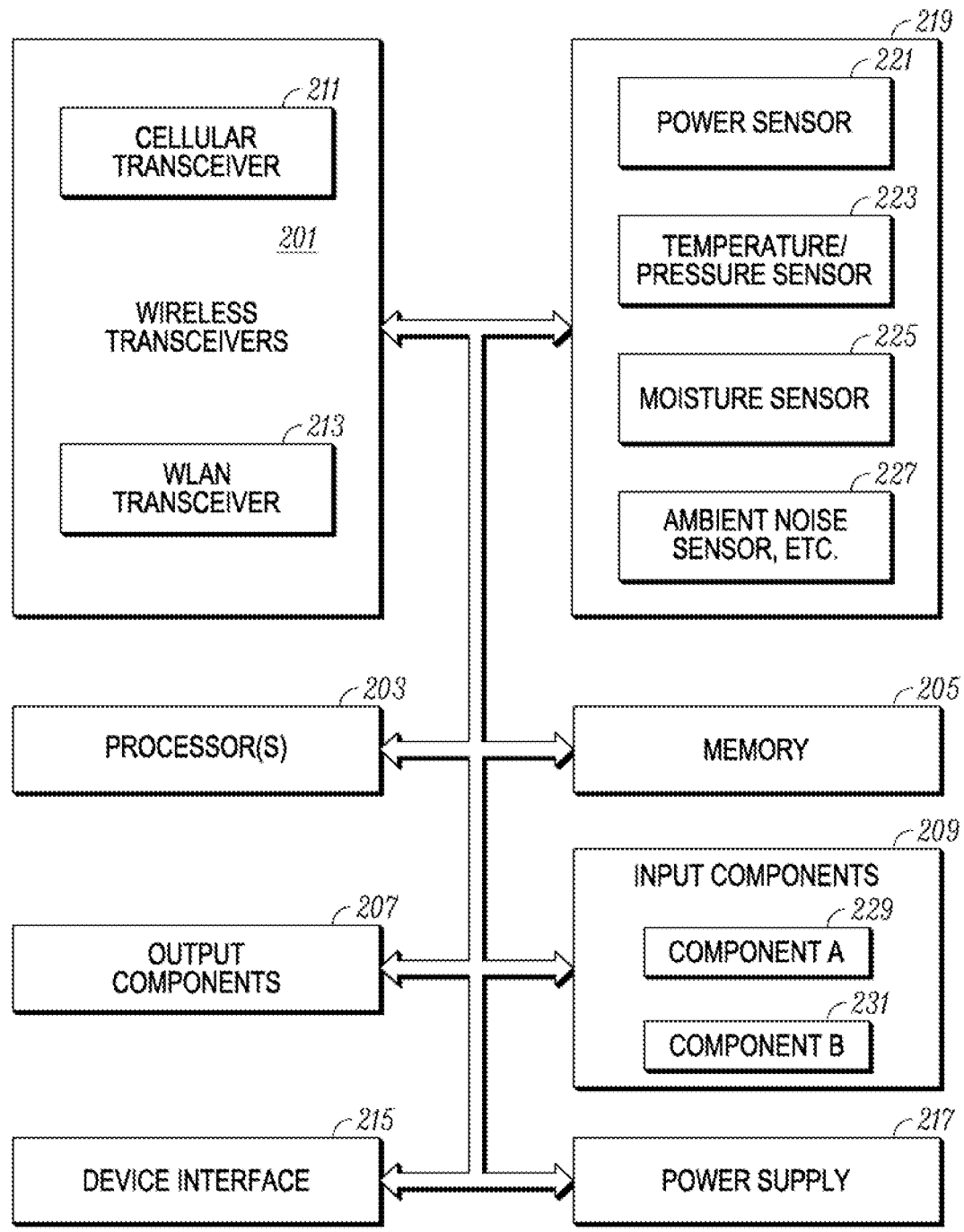
FIG. 2 is a block diagram of example internal components of an embodiment in accordance with the present invention.

Referring to FIG. 2, there is shown a block diagram representing example components 200 that may be used for an embodiment in accordance with the present invention. The example embodiment may includes one or more wireless transceivers 201, one or more processors 203, one or more memories 205, one or more output components 207, and one or more input components 209. Each embodiment may include a user interface that comprises one or more output components 207 and one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, or IEEE 802.16) and their variants, as represented by cellular transceiver 311. Each wireless transceiver 201 may also utilize wireless technology for communication, such as, but are not limited to, peer-to-peer or ad hoc communications such as HomeRF, ANT, Bluetooth and IEEE 802.11(a, b, g or n); and other forms of wireless communication such as infrared technology, as represented by WLAN transceiver 213. Also, each transceiver 201 may be a receiver, a transmitter or both.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the portable electronic device, such as interaction among the components of the internal components 200, communication with external devices via each transceiver 201 and/or the device interface (see below), and storage and retrieval of applications and data to and from the memory 205. Each application includes executable code utilizes an operating system to provide more specific functionality for the portable electronic device. Data is non-executable code or information that may be referenced and/or manipulated by an operating system or application for performing functions of the portable electronic device.

The input components 209, such as a user interface, may produce an input signal in response to detecting a predetermined gesture at an input component, such as the touch-sensitive surface substantially parallel to the display. As a result, a transceiver 201 may terminate communication with the remote device in response to the input signal from the user interface. In addition, the input components 209 may include one or more additional components, such as a video input component such as an optical sensor (for example, a camera), an audio input component such as a microphone, and a mechanical input component or activator such as button or key selection sensors, touch pad sensor, another touch-sensitive sensor, capacitive sensor, motion sensor, and switch. The input components 209 may also include other sensors, such as the light sensor, the motion sensor and the proximity sensor described above. Likewise, the output components 207 of the internal components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

For the present invention, it is important to note that the portable electronic devices and methods described herein have the capability of switching between two or more user interfaces. Thus, each device or method will have at least two user interfaces, such as two input components 209, two output components 207, or one of each of the input and output components. For some embodiments, as shown in FIG. 2, the input components 209 may include a first input component 229 and a second input component 231. Similarly, for some embodiments, the output components 207 may include first and second output components (not shown). The two user interfaces may change state in response to one or more sensors detecting one or more predetermined environmental conditions.

The portable electronic device 100 has two or more interchangeable user interfaces supported by the housing 101 and, thus, adaptively switches between these user interfaces. The portable electronic device 100 comprises a first user interface having an active state and an inactive state, and a second user interface having an active state and an inactive state. The second user interface is inactive while the first user interface is in the active state, and the first user interface is inactive when the second user interface is in the active state. The first and second user interfaces change state in response to one or more sensors detecting the predetermined environmental condition.

For one embodiment, the first and second user interfaces may be substantially parallel to each other, which at least a portion of the first user interface overlaps at least a portion of the second user interface. For example, the first and second user interfaces may be different touch screen technologies, such as capacitive, resistive or temperature-based technologies, that overlay the display 105 of the device 100.

For another embodiment, one user interface may provide better performance than another user interface under a particular environmental condition. In such case, the states of the user interfaces may change so that the user interface with better performance or sensitivity is active and the other user interface is inactive in response to one or more sensors detecting the particular environmental condition. For example, when moisture level of the external environment exceeds a threshold level, a temperature-based input component may operate better than a capacitive input component, so the temperature-based input component may be activated and the capacitive based input component may be inactivated.

For still another embodiment, one user interface may require less power than another user interface under a particular environmental condition. The user interfaces may change states so that the user interface requiring less power is active and the other user interface is inactive in response to one or more sensors detecting the particular environmental condition. The particular environmental condition may indicate that an energy level of one of the user interfaces is below a threshold level of energy.

The internal components 200 may further include a device interface 215 to provide a direct connection to auxiliary components or accessories for additional or enhanced functionality. In addition, the internal components 200 preferably include a power source or supply 217, such as a portable battery, for providing power to the other internal components and allow portability of the portable electronic device 100.

Although the input components 209 described above are intended to cover all types of input components included and/or utilized by the portable electronic device, FIG. 2 provides a separate illustration of various sensors 219 that may be included and/or utilized by the device for emphasis. It is to be understood that, although the various sensors 219 are shown separate from the input components of 209, the various sensors are generally considered to be a part of the input components. The various sensors 219 may include, but are not limited to, one or more power sensors 221, one or more temperature sensors 223, one or more pressure sensors 223, and one or more moisture sensors 225, and/or one or more other sensors, such as ambient noise sensors 227, light sensors, motion sensors, proximity sensors and the like.

It is to be understood that FIG. 2 is provided for illustrative purposes only and for illustrating components of a portable electronic device in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Turning to the operation of the portable electronic device, the device may adaptively switch between user interfaces, such as two input components, two output components, and one input component and one output component. The portable electronic device may detect an environmental condition associated with an environment external to its housing at one or more of its sensors, and change the state of the user interfaces in response to the detected environmental condition. Some embodiments may switch between two input components. For example, a moisture sensor of the device may detect a moisture level of the environmental condition to exceed a predetermined threshold, and the device may adaptively switch from a capacitive input component to a temperature-based input component. As another example, a temperature sensor of the device may detect a temperature level of the environmental condition to exceed a predetermined threshold, and the device may adaptively switch from the temperature-based input component to the capacitive input component. The device may consider detections by more than one sensor. For some embodiments, the detections by the sensors may occur concurrently. For other embodiments, the detections may occur separately, such as, if a reading is not clear for one sensor, then the sensor may adaptively seek assistance or verification from another sensor.

For still another example, when the temperature sensor detects the temperature level of the environmental condition to exceed a predetermined threshold, and the device may consider the moisture level detected by the moisture sensor when determining whether to switch from the temperature-based input component to the capacitive input component. For yet another example, the device may consider an energy level of a power source detected by the portable electronic device in conjunction with, or exclusive of, detections by the sensors, when determining whether to adaptively switch from one user interface to another. Further, contact to a touch-sensitive screen by shielded or semi-shielded hand (such as a glove worn over the user's hand) may require a change of state for the user interfaces. For example, a capacitive sensor may not work well in detecting user interaction, but a non-capacitive sensor may perform better.

Figure 3:
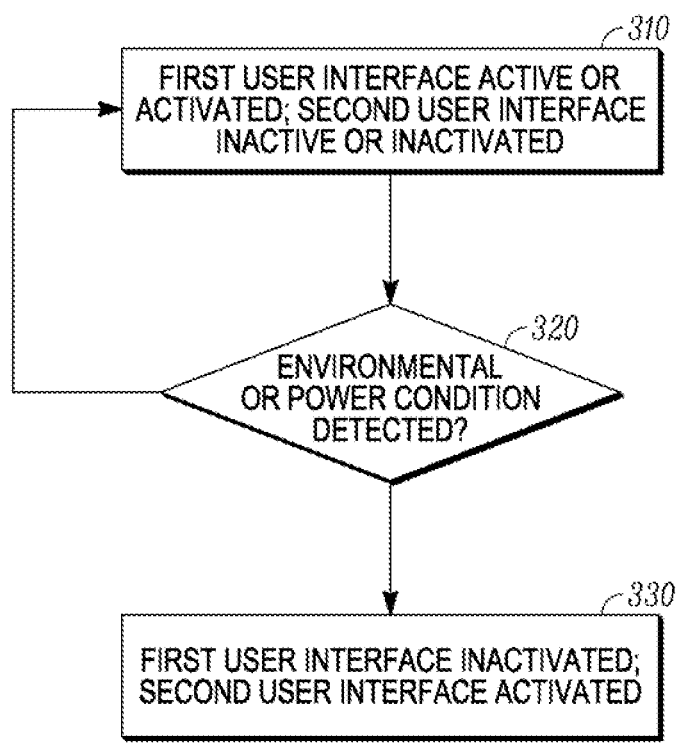
FIG. 3 is a flow diagram representing an example operation of an embodiment in accordance with the present invention.

Referring to FIG. 3, there is shown is a flow diagram representing an example operation 300 of an embodiment in accordance with the present invention. The processor 203, output components 207, or input components 209 of the device 100 may determine that a first user interface of the portable electronic device is active while a second user interface of the portable electronic device is inactive, as represented by step 310. Next, one or more sensors 219 of the device 100 may detect an environmental condition associated with an environment 117 external to the housing 101 of the portable electronic device 100, as represented by step 320. Environmental conditions include, but are not limited to, temperature level, pressure, level, moisture, level, audio (such as ambient noise) level, and the like. Thereafter, the second user interface of the portable electronic device 100 is activated and the first user interface of the portable electronic device is deactivated in response to detecting the environmental condition by the sensor or sensors, as represented by step 330. The switching from one user interface to another may be based on the performance and/or sensitivity of the user interfaces relative to each other and, based on these characteristics, a determination may be made in response to the detection of the above environmental condition.

The user interfaces may change state in response to one or more operation mode of the portable electronic device as well as the predetermined environmental condition detected by the sensor or sensors 219. For some embodiments, a change in state of the user interfaces may be preferred when a particular user operation is detected. For example, a particular user interface may be preferable for a detailed operation (such as area selection or typing at the touch screen) as opposed to a non-detailed operation (such as sliding or swiping across the touch screen). Certain operational modes of the device may require both types of interaction, such as gaming applications. For other embodiments, the user interfaces do not need to change state, because a user of the device may not require precision interaction above a certain level, particularly for passive or non-interaction by the user. For example, if the display is showing an image or a series of images, or the device is in a call, viewing of multimedia, playing of audio, or any other situation where user interaction with the first or second user interface does not occur, then a change in state for the user interface may not be necessary or desired. Also, for another example, the processor 203 or another component may override an attempt to change the state of a user interface based on one or more operation modes of the portable electronic device. Further, a change in state of the user interfaces may be preferred, or overridden, when a particular user operation associated with the user's inability to perform area selection of text entry is detected. The device determines that the user is making above a threshold number of corrections, retyping attempts, or other indications of inaccuracy, then this operation mode may be considered along with the predetermined environmental condition detected by the sensor or sensors 219 to determine whether to change the state of the user interfaces.

Other characteristics of interest include the power consumption properties of the user interfaces relative to each other, and other environmental conditions includes the power level of the power source or supply 217 (e.g., when the power level is below, meets, or exceeds a particular threshold) when detected by one or more sensors 219. Thus, still referring to FIG. 3, the processor 203, a power sensor 221 of the sensors 221, or the power source or supply 217 may detect an energy level of the power source or supply of the portable electronic device, at step 320. The second user interface of the portable electronic device may be activated and the first user interface of the portable electronic device may be deactivated in response to detecting the energy level of the power source or supply 217, at step 330.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A portable electronic device comprising:
   a housing;
   a touch-sensitive screen;
   a first touch-sensitive screen technology sub-system for the touch-sensitive screen supported by the housing, the first touch-sensitive screen technology sub-system having an active state and an inactive state;
   a second touch-sensitive screen technology sub-system for the touch-sensitive screen supported by the housing, the second touch-sensitive screen technology sub-system having an inactive state and an active state, wherein the second touch-sensitive screen is in the inactive state while the first touch-sensitive screen technology sub-system is in the active state; and
   at least one sensor supported by the housing, the at least one sensor detecting a predetermined environmental condition,
   wherein the second touch-sensitive screen technology sub-system changes from the inactive state to the active state and the first touch-sensitive screen technology sub-system changes from the active state to the inactive state in response to the at least one sensor detecting the predetermined environmental condition, and
   wherein the second touch-sensitive screen technology sub-system has better sensitivity than the first touch-sensitive screen technology sub-system under the predetermined environmental condition.

2. The portable electronic device of claim 1, wherein the predetermined environmental condition is associated, at least in part, with an environment external to the housing.

3. The portable electronic device of claim 1, wherein:
   the first and second touch-sensitive screen technology sub-systems are substantially parallel to each other; and
   at least a portion of the first touch-sensitive screen technology sub-system overlaps at least a portion of the second touch-sensitive screen technology sub-system.

4. The portable electronic device of claim 1, wherein the second touch-sensitive screen technology sub-system changes from the inactive state to the active state and the first touch-sensitive screen technology sub-system changes from the active state to the inactive state in response to at least one operation mode of the portable electronic device as well as the predetermined environmental condition detected by the at least one sensor.

5. The portable electronic device of claim 1, wherein each of the first and second touch-sensitive screen technology sub-systems is an input component effective to detect user input.

6. The portable electronic device of claim 1, wherein the touch-sensitive screen is an output component effective to provide audio, visual or multimedia output.

7. The method of claim 1, wherein the first touch-sensitive screen technology sub-system comprises one or more of a capacitive sensor, a temperature sensor, or a resistive sensor, and wherein the second touch-sensitive screen technology sub-system comprises one or more of a capacitive sensor, a temperature sensor, or a resistive sensor.

8. A method comprising:
   determining that a first touch-sensitive screen technology sub-system for a touch-sensitive screen of a portable electronic device is active while a second touch-sensitive screen technology sub-system for the touch-sensitive screen of the portable electronic device is inactive;
   detecting a predetermined environmental condition by at least one sensor of the portable electronic device; and
   activating the second touch-sensitive screen technology sub-system of the portable electronic device and deactivating the first touch-sensitive screen technology sub-system of the portable electronic device in response to detecting the predetermined environmental condition by the at least one sensor, wherein the second touch-sensitive screen technology sub-system provides a different sensitivity level than the first touch-sensitive screen technology sub-system under the predetermined environmental condition.

9. The method of claim 8, wherein the predetermined environmental condition is associated, at least in part, with an environment external to a housing of the portable electronic device.

10. The method of claim 8, wherein:
    the first and second touch-sensitive screen technology sub-systems are substantially parallel to each other; and
    at least a portion of the first touch-sensitive screen technology sub-system overlaps at least a portion of the second touch-sensitive screen technology sub-system.

11. The method of claim 8, wherein activating the second touch-sensitive screen technology sub-system of the portable electronic device and deactivating the first touch-sensitive screen technology sub-system of the portable electronic device includes activating the second touch-sensitive screen technology sub-system of the portable electronic device and deactivating the first touch-sensitive screen technology sub-system of the portable electronic device in response to at least one operation mode of the portable electronic device as well as the predetermined environmental condition detected by the at least one sensor.

12. The method of claim 8, wherein each of the first and second touch-sensitive screen technology sub-systems is an input component effective to detect user input.

13. The method of claim 8, wherein the touch-sensitive screen is an output component effective to provide audio, visual or multimedia output.

14. A method comprising:
    activating a first touch-sensitive screen technology sub-system of a touch-sensitive screen of a portable electronic device while a second touch-sensitive screen technology sub-system for the touch-sensitive screen of the portable electronic device is inactive;
    detecting an energy level of a power source of the portable electronic device; and
    activating the second touch-sensitive user interface of the portable electronic device and deactivating the first touch-sensitive screen technology sub-system of the portable electronic device in response to determining that the energy level of the power source is below a threshold level of energy, wherein the second touch-sensitive screen technology sub-system requires less power than the first touch-sensitive screen technology sub-system.

15. The method of claim 14, wherein each of the first and second touch-sensitive screen technology sub-systems is an input component effective to detect user input.

16. The method of claim 14, wherein the touch-sensitive screen is an output component effective to provide audio, visual or multimedia output.

17. The method of claim 14, wherein the first touch-sensitive screen technology sub-system comprises one or more of a capacitive sensor, a temperature sensor, or a resistive sensor, and wherein the second touch-sensitive screen technology sub-system comprises one or more of a capacitive sensor, a temperature sensor, or a resistive sensor.

* * * * *